(12) United States Patent
Sato et al.

(10) Patent No.: US 7,151,156 B2
(45) Date of Patent: Dec. 19, 2006

(54) BLOCK POLYMER, POLYMER-CONTAINING COMPOSITION, INK COMPOSITION AND LIQUID-DISCHARGING APPARATUS

(75) Inventors: Koichi Sato, Kanagawa (JP); Masayuki Ikegami, Kanagawa (JP); Sakae Suda, Kanagawa (JP); Ikuo Nakazawa, Kanagawa (JP); Keiichiro Tsubaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/909,282

(22) Filed: Aug. 3, 2004

(65) Prior Publication Data

US 2005/0033010 A1    Feb. 10, 2005

(30) Foreign Application Priority Data

Aug. 5, 2003    (JP) ............................. 2003-286925
Jul. 23, 2004   (JP) ............................. 2004-216364

(51) Int. Cl.
*C08G 18/34* (2006.01)

(52) U.S. Cl. ................. 528/86; 528/271; 528/361

(58) Field of Classification Search ........ 528/271, 528/361, 86
See application file for complete search history.

(56) References Cited

U.S. PATENT DOCUMENTS 5,085,698 A    2/1992   Ma et al. .................. 106/20

2002/0186288 A1   12/2002  Nakazawa et al. .......... 347/100
2003/0027894 A1    2/2003  Sato et al. ................. 523/160
2003/0050364 A1    3/2003  Sato et al. ................. 523/160

FOREIGN PATENT DOCUMENTS

| JP | 11-80221 A    |   | 3/1999  |
| JP | 11-322866 A   |   | 11/1999 |
| JP | 11-322942 A   |   | 11/1999 |
| JP | 1243624       | * | 9/2002  |
| JP | 1285948       | * | 2/2003  |

OTHER PUBLICATIONS

Sadahito Aoshima, et al., "Living Cationic Polymerization of Vinyl Monomers by Organoaluminum Halides," Polymer Bulletin 15, pp. 417-423 (1986).

* cited by examiner

*Primary Examiner*—Duc Truong
(74) *Attorney, Agent, or Firm*—Fitzpatrick, Cella, Harper & Scinto

(57) ABSTRACT

The present invention provides a block polymer that comprises a plurality of block segments, wherein at least one block segment comprises a repeating unit having an ester moiety bonded to a main chain in a forward direction through a connecting group of two or more atoms, and the block polymer has a molecular weight distribution (Mw/Mn) of 1.3 or less. Also provided is a polymer composition containing the above block polymer and a functional material.

10 Claims, 2 Drawing Sheets

BLOCK POLYMER, POLYMER-CONTAINING COMPOSITION, INK COMPOSITION AND LIQUID-DISCHARGING APPARATUS

BACKGROUND OF THE INVENTION

1. Field of the Invention

The present invention relates to a block polymer having a useful function, a polymer-containing composition which contains the block polymer, an ink composition, an apparatus for discharging a liquid using the above-described composition, and a head kit.

2. Related Background Art

Aqueous dispersion materials containing functional substances, e.g., agricultural chemicals such as herbicide and insecticide, medicines such as anti-cancer drugs, antiallergic drugs and antiinflammatory agents, and coloring agents such as ink and toner containing a coloring material, are conventionally well known. In recent years, digital printing technology is making great strides. Digital printing technology, which is represented by the electrophotographic technology and ink-jet technology, is becoming an indispensable imaging technology in offices and home.

Among them, the ink-jet technology is featured by its compactness and low power consumption as a direct recording method. In addition, the image quality has been greatly improved by, for example, the use of fine nozzles. According to one ink-jet method, the ink supplied from an ink tank is heated with a heater in a nozzle to generate a bubble in the ink and an ink droplet is ejected from the nozzle to form an image on a recording medium. Another method discharges ink from the nozzle by the vibration of a piezoelectric element.

Inks used for these methods are usually aqueous dye solutions, so that blurring or a phenomenon called feathering along the direction of paper fiber between superimposed colors at the recorded region on a recording medium may occur. For the purpose of improving them, the use of a pigment dispersion ink is studied in U.S. Pat. No. 5,085,698. However, further improvement is still expected.

SUMMARY OF THE INVENTION

One object of the present invention is to provide a block polymer which can excellently disperse a functional material in a solvent.

Another object of the present invention is to provide a composition containing the block polymer having excellent dispersibility for a functional material.

Still another object of the present invention is to provide an ink composition containing the block polymer, which has excellent dispersibility for a coloring material and superior image-recording properties.

Still another object of the present invention is to provide a liquid-discharging apparatus, which can stably discharge the above-described composition of excellent dispersibility.

Still another object of the present invention is to provide a head kit which can stably store the above composition.

The above-described objects can be achieved by the following embodiments of the present invention.

The first embodiment according to the present invention is a block polymer that comprises a plurality of block segments, in which at least one block segment comprises a repeating unit having an ester moiety bonded to a main chain in a forward direction through a connecting group of two or more atoms, and wherein the block polymer has a molecular weight distribution (Mw/Mn) of 1.3 or less.

The second embodiment according to the present invention is a polymer-containing composition containing the above block polymer, a solvent or dispersion medium, and a functional material.

The third embodiment according to the present invention is an ink composition that comprises the above block polymer, a solvent or dispersion medium, and a coloring material.

The fourth embodiment according to the present invention is a liquid-discharge apparatus that comprises means for ejecting the above polymer-containing composition or ink composition, and driving means for driving the ejection means.

The fifth embodiment according to the present invention is a head kit that comprises a discharging head for discharging the above ink composition, and a container for holding the above ink composition to be supplied to the above discharging head.

The present invention can provide a block polymer which can excellently disperse a functional material in a solvent.

In addition, the present invention can provide a polymer-containing composition with the use of the block polymer, which has excellent dispersibility for a functional material.

In addition, the present invention can provide an ink composition having excellent dispersibility for a coloring material and a superior printing property, by using the block polymer.

In addition, the present invention can provide a liquid-discharging apparatus which stably discharges the above-described composition having excellent dispersibility.

In addition, the present invention can provide a head kit which stably holds the above-described composition.

DESCRIPTION OF THE PREFERRED EMBODIMENTS

Figure 1:
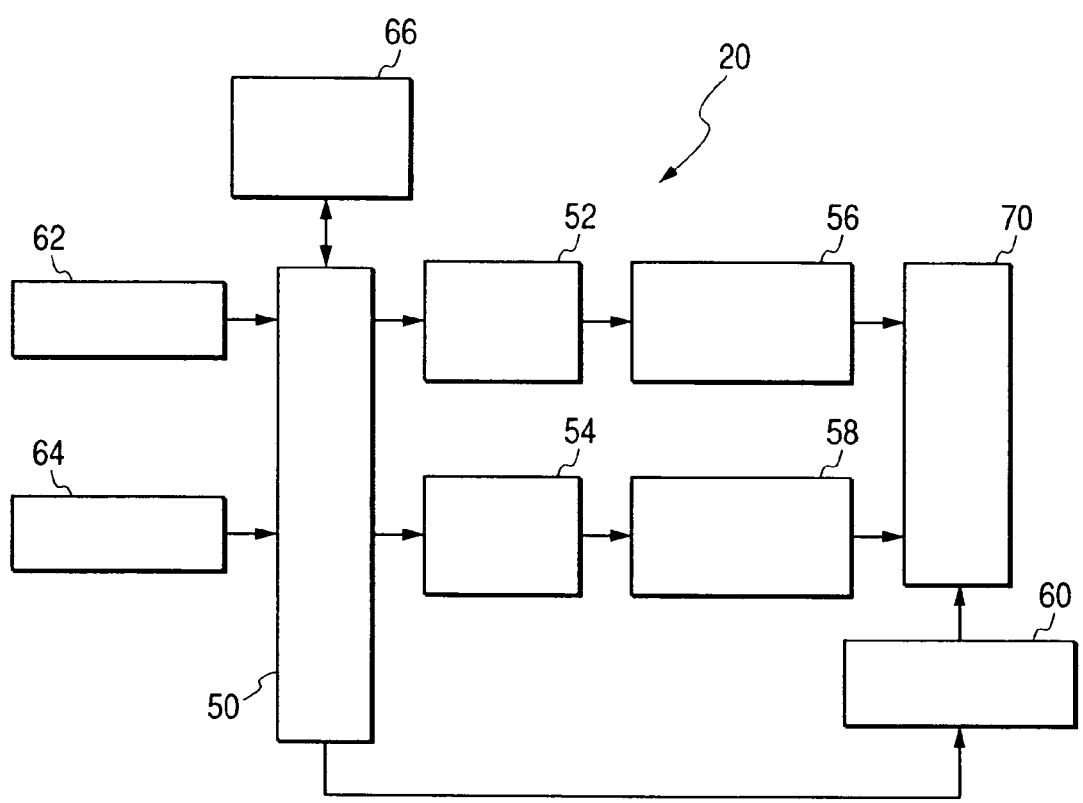
FIG. 1 schematically shows the mechanism of an ink-jet recording apparatus according to the present invention.

As a result of intensive investigations on the above-described background art and objects, the present inventors completed the present invention.

The first embodiment according to the present invention is a block polymer that comprises a plurality of segments wherein at least one segment has a repeating unit structure in which an ester moiety bonded in a forward direction to the main chain through a connecting group of two or more atoms, and the block polymer has a molecular weight distribution (Mw/Mn) of 1.3 or less.

In the present invention, "an ester moiety is bonded in a forward direction to the main chain" means that in the monomer unit the ester moiety is linked to the main chain in such a manner that hydrolysis thereof gives a free acid group linked to the main chain.

The molecular weight distribution (Mw/Mn) of the block polymer according to the present invention is 1.30 or less, preferably 1.20 or less, more preferably, 1.15 or less, and most preferably 1.10 or less. As the molecular weight distribution becomes small, the polymer compound has more stable characteristics, for example, it can achieve more stable dispersion of a functional material. The molecular weight distribution can be measured normally by gel permeation chromatography or volume-exclusion chromatography.

In the present invention, "bonded to the main chain through a connecting group with two or more atoms" means that the ester or acid moiety is not directly bonded to the main chain but through a certain connecting group having two or more atoms. Unlike a polymer of acrylic acid, methacrylic acid, itaconic acid or the derivatives thereof where a moiety of carboxylic acid ester, carboxylic acid or salt thereof is bonded to the main chain with restrained mobility, the ester moiety of the block polymer of the present invention can move considerably freely because of the connecting group such as an alkylene or alkyleneoxy group. Accordingly, the number of atoms of the connecting group are 2 or more, preferably 3 or more, more preferably 4 or more, and further preferably 5 or more. With a structure in which the ester group is too closely bonded to the main chain, the mobility of the ester group, or an organic acid being a hydrolysis product thereof or a salt thereof is restricted so that inter- and intra-molecular interaction may not be fully exhibited.

In the present invention, the ester moiety means an ester structure, i.e., a condensate of alcohol and organic acid. A preferable structure of the ester moiety is an ester of a carboxylic acid, while the free acid and acid salt thereof mean the corresponding carboxylic acid and a salt thereof, respectively. The free acid and acid salt is often obtained by hydrolysis of the corresponding ester, and it is practically preferable. Ester of sulfonic acid is also preferred. For this reason, even though the ester structure is not so effective in inter- and intra-molecular interaction, it is very useful as a precursor of a free acid and an acid salt. The molecular weight and molecular weight distribution of a polymer in the free acid form can be measured by gel permeation chromatography. In one preferred form according to the present invention, the block polymer has a molecular weight distribution (Mw/Mn) of 1.30 or less, preferably 1.20 or less, further preferably 1.15 or less and more preferably 1.10 or less, determined by this method.

The main chain structure of the polymer can be any such as polyalkylene, polyalkenyl ether, polymethacrylate, polyacrylate, polysiloxane, polyethylene oxide, polylactide, polyamide and polyester. The main chain structure is preferably a polyalkenyl ether and further preferably a polyvinyl ether in view of highly flexible molecular mobility.

The following general formula 1 or 2 represents a preferable repeating unit structure of polyvinyl ether main chain, having the above-described ester moiety in the forward direction or in a free acid or ionic salt form thereof:

General Formula (1)

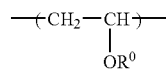

(wherein, $R^0$ represents —X—COOH, —X—COOR$^{10}$ and —X—COO-M; and X represents a straight-chain, branched-chain or cyclic alkylene group having 1 to 20 carbon atoms, —(CH($R^2$)—CH($R^3$)—O)$_p$—(CH$_2$)$_m$—, —(CH$_2$)$_m$—(O)$_n$—(CH$_2$)$_q$—, or a structure where at least one of these methylene groups is substituted by an oxygen atom or an aromatic ring structure; p represents an integer of 1 to 18; m represents an integer of 1 to 36; n represents 1 or 0; q represents an integer of 1 to 18; $R^{10}$ represents an alkyl group, or an aromatic ring structure which may be substituted; M represents a monovalent or polyvalent cation; each of $R^2$ and $R^3$ represents a hydrogen atom or an alkyl group, and may be identical with or different from the other): or General Formula (2)

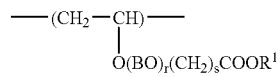

(wherein, B represents a straight-chain or branched-chain alkylene group having 1 to 15 carbon atoms, which may be substituted; r represents an integer of 1 to 30; when r is not 1, each B may be different from the others; s represents an integer of 2 to 30; $R^1$ represents a hydrogen atom, an alkyl group which may be substituted, an aromatic ring structure which may be substituted, or M; and when $R^1$ is M, the O(BO)$_r$(CH$_2$)$_s$COO moiety is a carboxylate anion, and M represents a monovalent or polyvalent metal cation).

Specific examples of the repeating unit structure expressed by the general formula 1 includes the following unit structures:

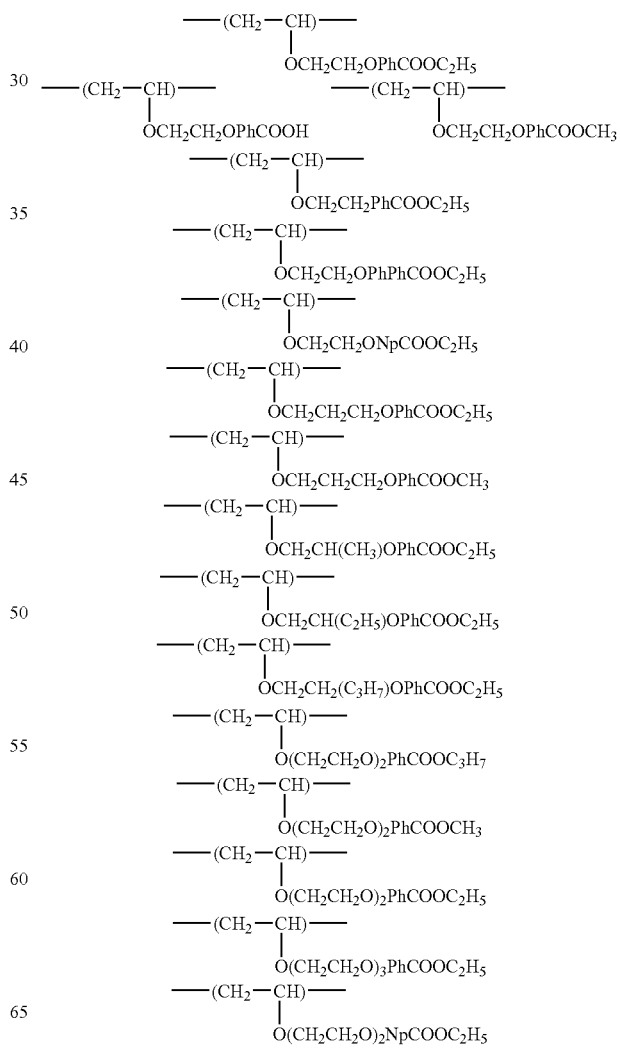

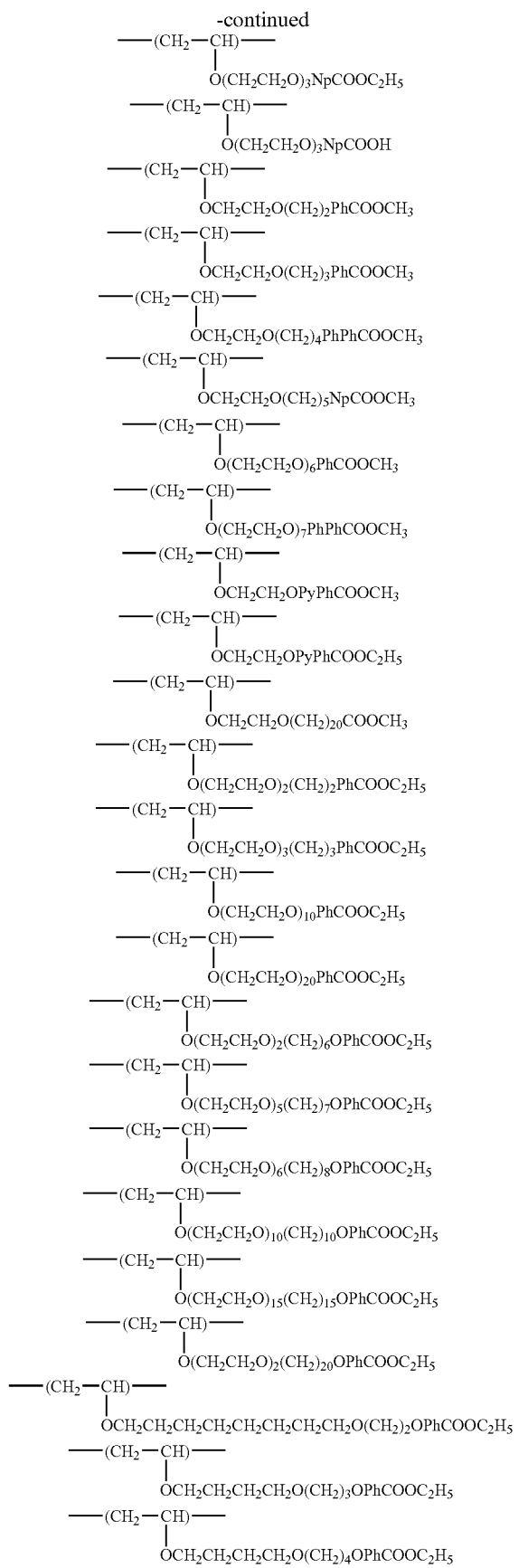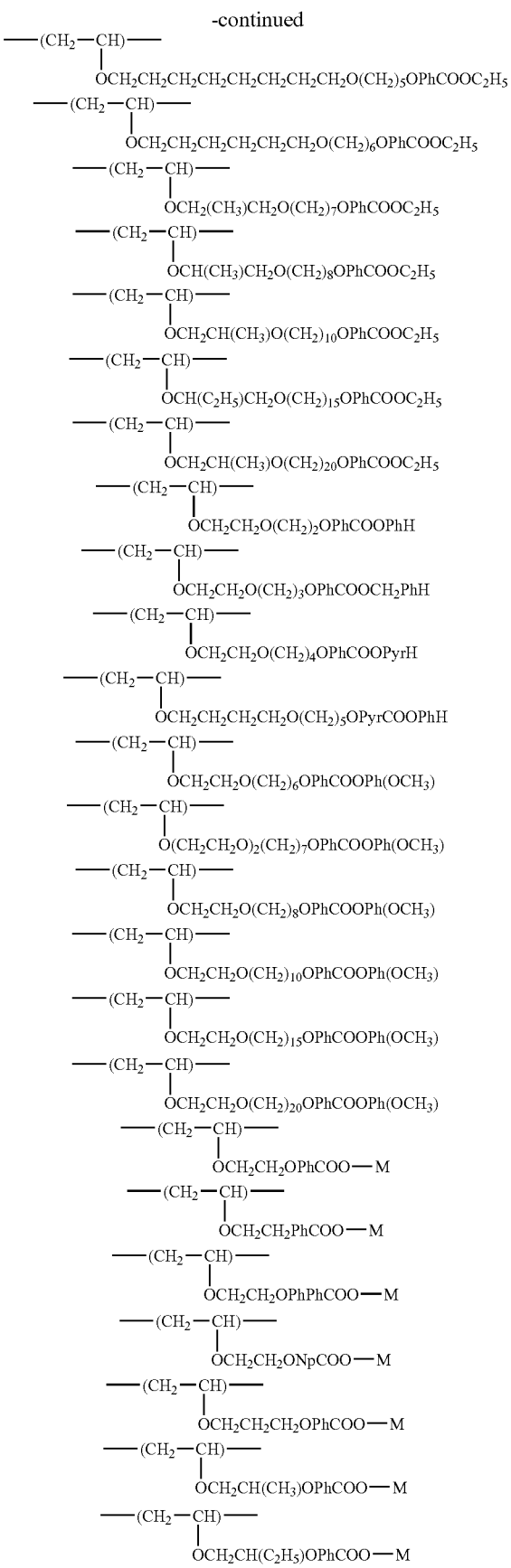

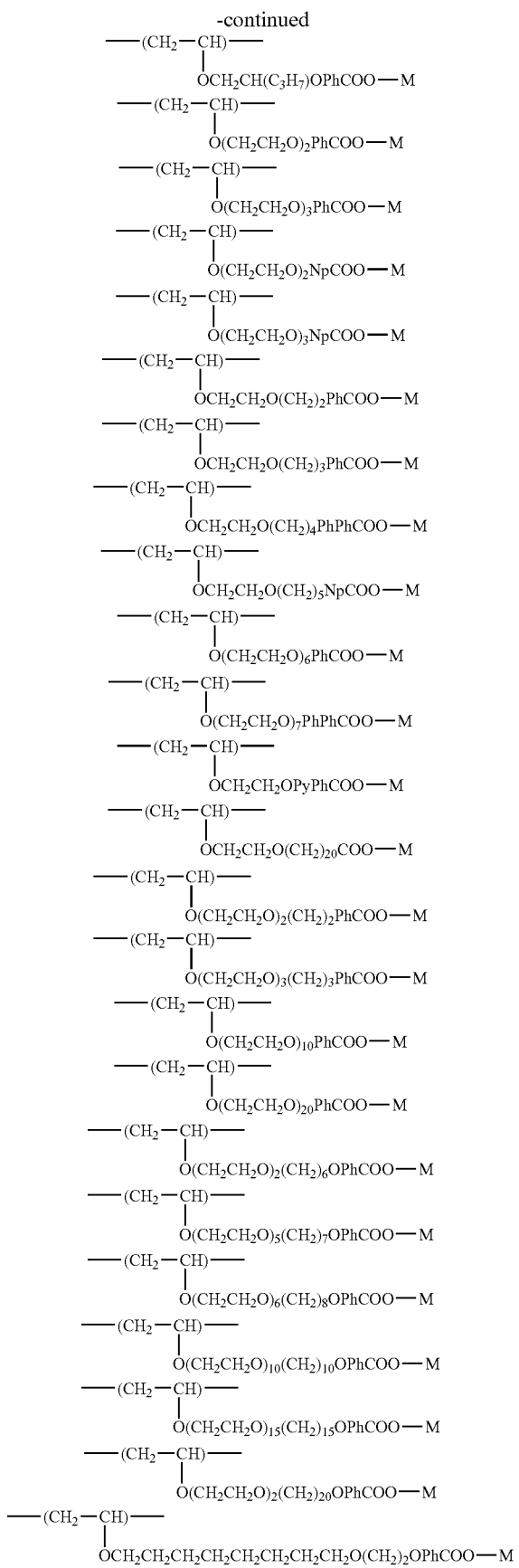
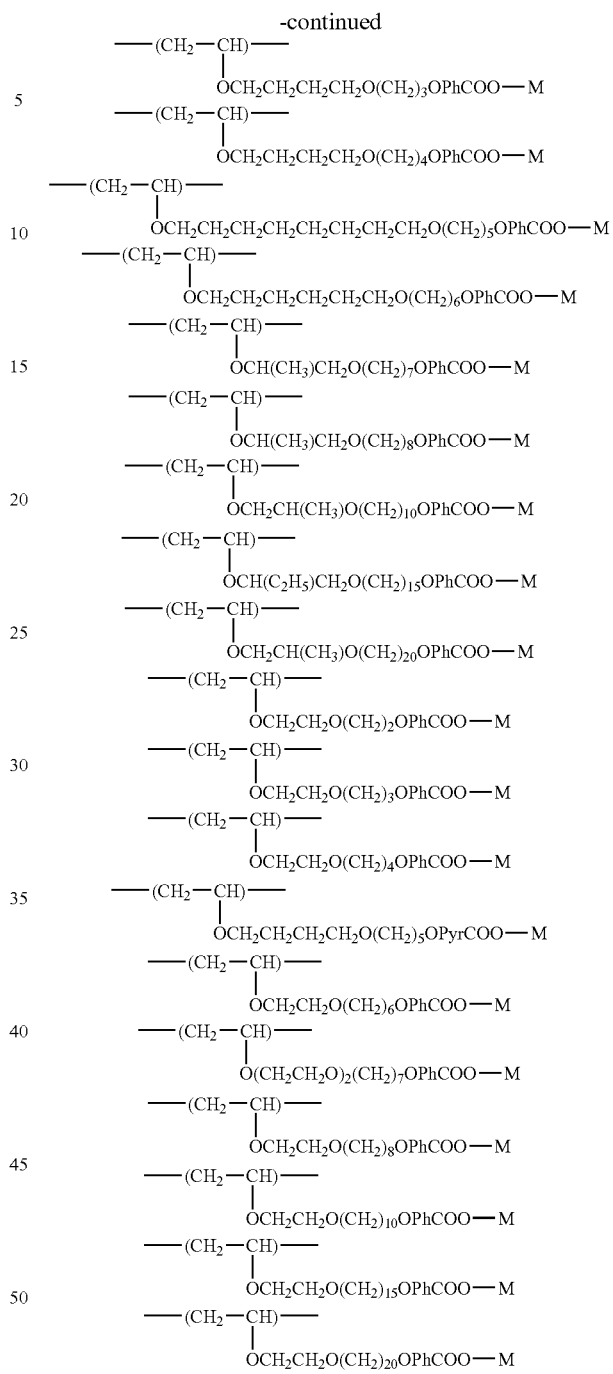
(wherein Ph represents 1,4-phenyl or 1,3-phenyl; Py represents 2,5-pyrimidyl; Pyr represents 2,5-pyridyl; and Np represents 2,6-naphthyl, 1,4-naphthyl, or 1,5-naphthyl).
Specific examples of the repeating unit structure expressed by the general formula (2) include the following unit structures.
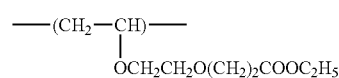

-continued

—(CH₂—CH)—
         |
         OCH₂CH₂O(CH₂)₃COOC₂H₅

—(CH₂—CH)—
         |
         OCH₂CH₂O(CH₂)₄COOC₂H₅

—(CH₂—CH)—
         |
         OCH₂CH₂O(CH₂)₅COOC₂H₅

—(CH₂—CH)—
         |
         OCH₂CH₂O(CH₂)₆COOC₂H₅

—(CH₂—CH)—
         |
         OCH₂CH₂O(CH₂)₇COOC₂H₅

—(CH₂—CH)—
         |
         OCH₂CH₂O(CH₂)₈COOC₂H₅

—(CH₂—CH)—
         |
         OCH₂CH₂O(CH₂)₁₀COOC₂H₅

—(CH₂—CH)—
         |
         OCH₂CH₂O(CH₂)₁₅COOC₂H₅

—(CH₂—CH)—
         |
         OCH₂CH₂O(CH₂)₂₀COOC₂H₅

—(CH₂—CH)—
         |
         OCH₂CH₂O(CH₂)₂COOCH₃

—(CH₂—CH)—
         |
         OCH₂CH₂O(CH₂)₃COOCH₃

—(CH₂—CH)—
         |
         OCH₂CH₂O(CH₂)₄COOCH₃

—(CH₂—CH)—
         |
         OCH₂CH₂O(CH₂)₅COOCH₃

—(CH₂—CH)—
         |
         OCH₂CH₂O(CH₂)₆COOCH₃

—(CH₂—CH)—
         |
         OCH₂CH₂O(CH₂)₇COOCH₃

—(CH₂—CH)—
         |
         OCH₂CH₂O(CH₂)₈COOCH₃

—(CH₂—CH)—
         |
         OCH₂CH₂O(CH₂)₁₀COOCH₃

—(CH₂—CH)—
         |
         OCH₂CH₂O(CH₂)₁₅COOCH₃

—(CH₂—CH)—
         |
         OCH₂CH₂O(CH₂)₂₀COOCH₃

—(CH₂—CH)—
         |
         O(CH₂CH₂O)₂(CH₂)₂COOC₂H₅

—(CH₂—CH)—
         |
         O(CH₂CH₂O)₃(CH₂)₃COOC₂H₅

—(CH₂—CH)—
         |
         O(CH₂CH₂O)₁₀(CH₂)₄COOC₂H₅

—(CH₂—CH)—
         |
         O(CH₂CH₂O)₂₀(CH₂)₅COOC₂H₅

—(CH₂—CH)—
         |
         O(CH₂CH₂O)₂(CH₂)₆COOC₂H₅

—(CH₂—CH)—
         |
         O(CH₂CH₂O)₅(CH₂)₇COOC₂H₅

—(CH₂—CH)—
         |
         O(CH₂CH₂O)₆(CH₂)₈COOC₂H₅

—(CH₂—CH)—
         |
         O(CH₂CH₂O)₁₀(CH₂)₁₀COOC₂H₅

—(CH₂—CH)—
         |
         O(CH₂CH₂O)₁₅(CH₂)₁₅COOC₂H₅

—(CH₂—CH)—
         |
         O(CH₂CH₂O)₂(CH₂)₂₀COOC₂H₅

—(CH₂—CH)—
         |
         OCH₂CH₂CH₂CH₂CH₂CH₂CH₂CH₂O(CH₂)₂COOC₂H₅

—(CH₂—CH)—
         |
         OCH₂CH₂CH₂O(CH₂)₃COOC₂H₅

—(CH₂—CH)—
         |
         OCH₂CH₂CH₂O(CH₂)₄COOC₂H₅

—(CH₂—CH)—
         |
         OCH₂CH₂CH₂CH₂CH₂CH₂CH₂O(CH₂)₅COOC₂H₅

—(CH₂—CH)—
         |
         OCH₂CH₂CH₂CH₂CH₂O(CH₂)₆COOC₂H₅

—(CH₂—CH)—
         |
         OCH(CH₃)CH₂O(CH₂)₇COOC₂H₅

—(CH₂—CH)—
         |
         OCH(CH₃)CH₂O(CH₂)₈COOC₂H₅

—(CH₂—CH)—
         |
         OCH₂CH(CH₃)O(CH₂)₁₀COOC₂H₅

—(CH₂—CH)—
         |
         OCH(C₂H₅)CH₂O(CH₂)₁₅COOC₂H₅

—(CH₂—CH)—
         |
         OCH₂CH(CH₃)O(CH₂)₂₀COOC₂H₅

—(CH₂—CH)—
         |
         OCH₂CH₂O(CH₂)₂COOPh

—(CH₂—CH)—
         |
         OCH₂CH₂O(CH₂)₃COOPh

—(CH₂—CH)—
         |
         OCH₂CH₂O(CH₂)₄COOPyr

—(CH₂—CH)—
         |
         OCH₂CH₂CH₂O(CH₂)₅COOPh

—(CH₂—CH)—
         |
         OCH₂CH₂O(CH₂)₆COOPh(OCH₃)

—(CH₂—CH)—
         |
         O(CH₂CH₂O)₂(CH₂)₇COOPh(OCH₃)

—(CH₂—CH)—
         |
         OCH₂CH₂O(CH₂)₈COOPh(OCH₃)

—(CH₂—CH)—
         |
         OCH₂CH₂O(CH₂)₁₀COOPh(OCH₃)

—(CH₂—CH)—
         |
         OCH₂CH₂O(CH₂)₁₅COOPh(OCH₃)

-continued $$—(CH_2—CH)—$$
$$|$$
$$OCH_2CH_2O(CH_2)_{20}COOPh(OCH_3)$$

(Ph represents a phenyl group and Pyr represents a pyridyl group.)

The block structure of the block polymer according to the present invention may be an AB diblock structure made of A and B block segments; an ABC triblock structure made of A, B and C block segments each different from the others; an ABA triblock structure having an identical block segment on the ends, or a block structure made of four or more block segments such as ABCD and ABCA. In view of functions expected for a coloring material-dispersing composition described later, particularly, for an ink composition, preference is given to an AB diblock polymer consisting of a hydrophobic segment and a hydrophilic segment having an organic acid moiety or ionic salt thereof; and an ABC triblock polymer having another segment in addition to a hydrophobic segment and a hydrophilic segment having a organic acid moiety or ionic salt form thereof. In a case of the ABC triblock polymer, preferably, A is a hydrophobic segment, B is a nonionic hydrophilic segment C is a hydrophilic segment having an organic acid moiety or ionic salt form thereof.

The term of the block polymer used in the present invention is equal to a block copolymer.

One preferred form of the block polymer according to the present invention is an amphipathic polymer compound. When a block polymer has at least one lyophobic block segment and at least one lyophilic block segment, it has the amphipathic property. In the present invention, the object of the lyophobicity and lyophilicity is preferably an aqueous solvent. In other words, the block polymer according to the present invention preferably has at least one each of a hydrophobic segment and a hydrophilic segment. The block polymer according to the present invention has a molecular weight distribution Mw/Mn of 1.30 or less, thereby can form very uniform micelles, resulting in lower viscosity. The molecular weight distribution is more preferably 1.20 or less, further preferably 1.15 or less, and most preferably 1.10 or less.

The repeating unit structure for constituting a block segment other than the block segment made of a repeating unit represented by the above general formula 1 or 2 preferably includes the repeating unit structure expressed by the following general formula 3:

General Formula (3)

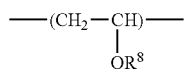

(wherein $R^8$ is selected from the group consisting of a straight chain, branched-chain or cyclic alkyl group having 1 to 18 carbon atoms, Ph, Pyr, Ph-Ph, Ph-Pyr, —(CH($R^{12}$)—CH($R^{13}$)—O)$_p$—$R^{14}$ and —(CH$_2$)$_m$—(O)$_n$—$R^{14}$; and the aromatic ring may be substituted with a straight chain or branched-chain alkyl group having 1 to 4 carbon atoms, and a carbon atom in the aromatic ring may be replaced with a nitrogen atom;

p is an integer of 1 to 18; m is an integer of 1 to 36; n is 0 or 1; each of $R^{12}$ and $R^{13}$ is independently a hydrogen atom or CH$_3$; $R^{14}$ is a hydrogen atom, a straight chain, branched-chain or cyclic alkyl group having 1 to 18 carbon atoms, Ph, Pyr, Ph-Ph, Ph-Pyr, —CHO, —CO—CH=CH$_2$ or —CO—C(CH$_3$)=CH$_2$; and if $R^{14}$ is other than the hydrogen atom, the hydrogen atom coupled to the carbon atom and a carbon atom in the aromatic ring may be respectively replaced with a straight chain or branched-chain alkyl group having 1 to 4 carbon atoms, F, Cl or Br, and with a nitrogen atom;

Ph represents a phenyl group; and Pyr represents a pyridyl group).

Furthermore, the repeating unit structure expressed by the general formula 3 includes the following repeating unit structure.

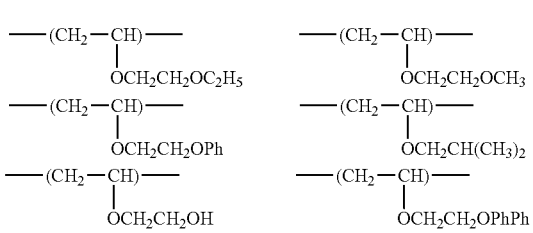

In addition, each block segment in a block polymer according to the present invention may be made of single species of repeating units, or plural species of repeating units. An example of the block segment consisting of plural species of repeating units includes a random copolymer and a gradation copolymer in which the composition ratio varies gradually. Further, the block polymer according to the present invention may be a block polymer grafted to the other polymer. For example, the block polymer according to the present invention may be a polymer where block polymers having three or more block segments are grafted to other polymers.

In the present invention, the content of the repeating units each having the above-described ester moiety in the forward direction is 0.01 to 99 mol %, preferably in the range of 1 to 90 mol % with respect to the total block polymer. When the content is in this range of 0.01 to 99 mol %, the polymer interaction due to the ester, or free acid or acid salt moiety in a polymer is sufficient. Similarly, the content of the preferred repeating unit structure represented by the general formula 1 or 2 in the polymer is in the range of 0.01 to 99 mol %, preferably of 1 to 90 mol % and further preferably of 2 to 40 mol % with respect to the total polymer compound. When the content is in this preferable range of 0.01 to 99 mol %, the interaction due to the carboxylic acid, a carboxylate ester or a carboxylic salt is sufficient.

A number average molecular weight (Mn) of a block polymer according to the present invention is 200 or more but not higher than 10,000,000, and the preferable range is 1,000 or more but not higher than 1,000,000. When the number average molecular weight is 200 or more but not higher than 10,000,000, the block polymer causes less entanglement in and between polymer chains, is easily dispersed into a solvent, and can fully show a steric effect as a polymer.

The preferred polymerization degree of each block segment is 3 or more but not higher than 10,000, further preferably 5 or more but not higher than 5,000, and further preferably 10 or more but not higher than 4,000.

The block polymer has preferably a flexible molecular mobility in order to improve dispersion stability and clathrate-forming (inclusion) properties, because of easy physical entanglement with the surface of a functional material; and molecular flexibility is also preferred because of easy formation of a coat layer on a recording medium, which is described later in detail. For this purpose, the main chain of the block polymer has a glass transition temperature Tg of preferably 20° C. or lower, more preferably 0° C. or lower, and further preferably minus 20° C. or lower. As for these points as well, a polymer having a polyvinyl ether structure generally having a low glass transition point and flexible characteristics is preferably used. Most of the above-described examples of the repeating unit structure have the glass transition temperature of about minus 20° C. or lower.

A block polymer according to the present invention is polymerized mostly in a cationic process. Examples of the initiator include a combination of a proton acid such as hydrochloric acid, sulfuric acid, methanesulfonic acid, trifluoroacetic acid, trifluoromethanesulfonic acid and perchloric acid, or a Lewis acid such as $BF_3$, $AlCl_3$, $TiCl_4$, $SnCl_4$, $FeCl_3$, $RAlCl_2$ and $R_{1.5}AlCl_{1.5}$ (where R represents an alkyl group), with a cation source (which includes a proton acid and the adduct of water, an alcohol and a vinyl ether, with a carboxylic acid) When one of these initiators is added to a polymerizable compound (a monomer), a polymerization reaction proceeds to synthesize a block polymer.

Next, a polymerization method further preferabe for the present invention is described. Among many reports concerning a synthesis method of a polymer containing a polyvinyl ether structure (Japanese Unexamined Patent Publication No. H11-080221), cation living polymerization according to Aoshima et al. is representative (Polymer Bulletin, 15, 417(1986), Japanese Unexamined Patent Publication No. H11-322942 and Japanese Unexamined Patent Publication No. H11-322866). By the cation living polymerization process, various polymers such as a homopolymer, a copolymer consisting of two or more monomers, and further a block polymer, a graft polymer and a gradation polymer can be synthesized to have a precise length (molecular weight). Alternatively, the living polymerization can be carried out with $HI/I_2$ or $HCl/SnCl_4$.

When carrying-out such a cation living polymerization, the extremely high purity is required for the monomer to be used in order to synthesize an ester-type block polymer having a very small molecular weight distribution, because of high accuracy of the polymerization reaction. In particular, the purity of a carboxylate ester type monomer corresponding to the polymerization precursor of the repeating unit structure expressed by the above-described general formula 1, is preferably 99.00% or higher, more preferably 99.50% or higher, further preferable 99.80% or higher, further more preferably 99.90% or higher, and more preferably than those, 99.95% or higher. Conventionally, such high purity was difficult to obtain.

Next, the second embodiment of the present invention will be described.

The second embodiment of the present invention is a polymer-containing composition that comprises a solvent or a dispersion medium, a functional material and the above-described block polymer according to the first embodiment of the present invention.

The polymer-containing composition contains the above-described block polymer and the functional material such as a coloring material, in which the above-described block polymer serves as a dispersant for the functional material.

The functional material is preferably liquid or solid, and may be a soluble material. For example, oil, pigment, metal, herbicide, insecticide, biomaterials, drugs, dye or molecular catalysts can be used.

The content of the block polymer in the polymer-containing composition according to the present invention is 0.2 to 99 mass % and is preferably 0.5 to 70 mass % of the total weight of the polymer-containing composition. When the content is 0.2 to 99 mass %, the functional material is dispersed sufficiently and suitable viscosity is obtained.

The content of the functional material in the polymer-containing composition according to the present invention is 0.1 to 80 mass %, and preferably is 0.5 to 60 mass %. When the content is 0.1 to 80 mass %, the functional material can fully express its function and is fully dispersed.

The polymer-containing composition according to the present invention contains a solvent and/or a dispersion medium, where the dispersion medium can be a binder resin.

As the solvent or the dispersion medium, water, an aqueous solvent or a nonaqueous organic solvent can be used. Of course, a mixture of them can be also used.

The usable aqueous solvent includes, for instance, polyhydric alcohols such as ethylene glycol, diethylene glycol, triethylene glycol, a polyethylene glycol, propylene glycol, a polypropylene glycol, and glycerol; polyalcohol ethers such as ethylene glycol monomethyl ether, ethylene glycol monoethyl ether, ethylene glycol monobutyl ether, diethylene glycol monoethyl ether and diethylene glycol monobutyl ether; nitrogen-containing solvents such as N-methyl-2-pyrrolidone, a substituted pyrrolidone, and triethanolamine; and monohydric alcohols such as methanol, ethanol and isopropyl alcohol. The usable nonaqueous organic solvent includes hydrocarbon solvents such as hexane, heptane, octane, decane and toluene, and solvents such as cyclohexanone, acetone, methyl ethyl ketone and butyl acetate.

The usable nonaqueous organic solvents also includes natural fats and oils such as olive oil, soybean oil, beef tallow and lard.

Examples of a binder resin include a styrene-acryl copolymer and a polyester.

The content of the solvent and the dispersion medium in the polymer-containing composition according to the present invention is 1 to 99 mass %, and preferably 10 to 95 mass %. When the content is 1 to 99 mass %, a functional material is preferably excellently dispersed.

In addition, a polymer-containing composition according to the present invention is allowed to contain components other than those described above, and to contain additives such as an ultraviolet ray absorbent, an anti-oxidant and a stabilizer.

The polymer-containing composition according to the present invention characteristically employs a polymer compound containing a repeating unit that has an ester moiety, free acid or acid salt thereof not directly bonded to the main chain of the polymer but through a connecting group of two or more atoms, which polymer compound has a molecular weight distribution of 1.30 or less. This enables formation of a fine and high-ordered structure. For instance, when a dispersion liquid contains a coloring material, water as a solvent, and a block polymer of the present invention, the coloring material can be included in micelles formed with the block polymer. Thus it is possible to prepare a coloring material-inclusion type ink composition. In addition, the diameter of the micelles in the dispersion composition becomes extremely uniform. Furthermore, the dispersion state of the micelles in the composition can be extremely stable and the viscosity of the dispersion composition can be reduced. For this purpose, small molecular weight distribution of the polymer according to the present invention is preferable, and it is 1.20 or less, further preferably 1.15 or less and most preferably 1.10 or less.

Next, an ink composition being a preferred form of the composition according to the present invention will be described.

The ink composition according to the present invention comprises the above-described block polymer, a solvent or dispersion medium, and a coloring material.

Next, other components than the block polymer contained in the ink composition according to the present invention will be described in detail. The other components include water, an aqueous solvent, a coloring material and additives.

A typical coloring material includes pigments and dyes. The pigment may be any of an organic pigment and an inorganic pigment, but the pigment used for the ink preferably employs a black pigment and trichromatic pigments of cyan, magenta and yellow. In addition, a color pigment other than the above-described pigments, an achromatic or light-colored pigment, or a pigment with a metallic luster may be used. In addition, in the present invention, a commercially available pigment or a newly synthesized pigment may be used. In addition, pigment and dye can be used in combination.

Commercially available pigments for each color of black, cyan, magenta and yellow, will be now explained with reference to examples below.

A black pigment includes Raven1060 (made by Colombian Carbon Co.), MOGUL-L (made by Cabot Corp.), Color Black FW1 (made by Degussa AG) and MA100 (made by Mitsubishi Chemical Corp.), but is not limited to them.

A cyan color pigment includes C.I. Pigment Blue-15:3, C.I. Pigment Blue-15:4 and C.I. Pigment Blue-16, but is not limited to them.

A magenta color pigment includes C.I. Pigment Red-122, C.I. Pigment Red-123 and C.I. Pigment Red-146, but is not limited to them.

A yellow pigment includes C.I. Pigment Yellow-74, C.I. Pigment Yellow-128 and C.I. Pigment Yellow-129, but is not limited to them.

An ink composition according to the present invention can employ a pigment that is self-dispersible in water. The water-dispersible pigment includes a pigment made to be dispersible by using a steric hindrance effect of a polymer absorbed on the pigment surface, and the pigment made to be dispersible by using an electrostatic repulsive force. The commercially available self-dispersing pigment includes CAB-0-JET200, CAB-0-JET300 (both made by Cabot Corp.), and Microjet Black CW-1 (made by Orient Chemical Industries, Ltd.). The amount of the pigment used in the ink composition according to the present invention is preferably 0.1 to 50 mass % with respect to the total mass of the ink composition. When the amount of the pigment is 0.1 to 50 mass %, a sufficient image density can be obtained and the pigment is excellently dispersed. The range of 0.5 to 30 mass % is further preferable.

In addition, dye can be used for an ink composition according to the present invention. As will be described below, water soluble dyes such as a direct dye, an acid dye, a basic dye, a reactive dye and a food dye, or an insoluble dye such as a disperse dye, can be used.

For instance, the water soluble dyes include the direct dyes such as C.I. direct black-17, -62 and -154; C.I. direct yellow-12, -87 and -142; C.I. direct red-1, -62 and -243; C.I. direct blue-6, -78 and -199; C.I. direct orange-34 and -60; C.I. direct violet-47 and -48; C.I. direct brown-109; and C.I. direct green-59:

the acid dyes such as C.I. acid black-2, -52 and -208; C.I. acid yellow-11, -29 and -71; C.I. acid red-1, -52 and -317; C.I. acid blue-9, -93 and -254; C.I. acid orange-7 and -19; and C.I. acid violet-49:

the reactive dyes such as C.I. reactive black-1, -23 and -39; C.I. reactive yellow-2, -77 and -163; C.I. reactive red-3, -111 and -221; C.I. reactive blue-2-101 and -217; C.I. reactive orange-5, -74 and -99; C.I. reactive violet-1, -24 and -38; C.I. reactive green-5, -15 and -23; and C.I. reactive brown-2, -18 and -33:

and C.I. basic black-2; C.I. basic red.-1, -12 and -27; C.I. basic blue-1 and -24; C.I. basic violet-7, -14 and -27; and C.I. food black-1 and -2.

In addition, commercially available oil-soluble dyes for each color will now be explained with reference to examples below.

Black oil-soluble dyes include C.I. Solvent Black-3, -22: 1, and -50, but are not limited to them.

Yellow oil-soluble dyes include C.I. Solvent Yellow-1, -25: 1, and -172, but are not limited to them.

Orange oil-soluble dyes include C.I. Solvent Orange-1, -40: 1, and -99, but are not limited to them.

Red oil-soluble dyes include C.I. Solvent Red-1, -111 and -229, but are not limited to them.

Violet oil-soluble dyes include C.I. Solvent Violet-2, -11 and -47, but are not limited to them.

Blue oil-soluble dyes include C.I. Solvent Blue-2, -43 and -134, but are not limited to them.

Green oil-soluble dyes include C.I. Solvent Green-1, -20 and -33, but are not limited to them.

Brown oil-soluble dyes include C.I. Solvent Brown-1, -12 and -58, but are not limited to them.

Although the examples of the coloring materials described above are preferable for an ink composition according to the present invention, the coloring materials usable for the ink composition according to the present invention are not particularly limited to the coloring materials described above. The content of the dye used for the ink composition according to the present invention is preferably 0.1 to 50 mass % with respect to the total mass of the ink.

As a solvent, any of water, an aqueous solvent and an organic solvent can be used, but water is preferably used. As for water, ion-exchanged water from which metal ions are removed, pure water and ultra pure water are preferable.

The water content in an ink composition according to the present invention is preferably 1 to 95 mass % and further preferably 5 to less than 90 mass %. The content in the range of 1 to 95 mass % shows a more remarkable effect of dispersion, and realizes a more uniform dispersing state of a functional material.

Examples of an aqueous solvent, for instance, include polyhydric alcohols such as ethylene glycol, diethylene glycol, triethylene glycol, a polyethylene glycol, propylene glycol, a polypropylene glycol and glycerol; polyalcohol ethers such as ethylene glycol monomethyl ether, ethylene glycol monoethyl ether, ethylene glycol monobutyl ether, diethylene glycol monoethyl ether and diethylene glycol monobutyl ether; and a nitrogen-containing solvent such as N-methyl-2-pyrrolidone, a substituted pyrrolidone, and triethanolamine. In addition, for accelerating drying of ink on paper (a recording medium), monohydric alcohol such as methahol, ethanol and isopropyl alcohol, can be used.

The content of an aqueous solvent in an ink composition according to the present invention is preferably 0.1 to 50 mass %, and further preferably 0.5 to less than 40 mass %. When the content is in the range of 0.1 to 50 mass %, the aqueous solvent gives a more remarkable wetting effect and can realize the uniform dispersion state of a functional material.

The content of the above block polymer in an ink composition according to the present invention is 0.1 to 90 mass % and preferably 0.5 to 70 mass %, with respect to the total weight. When the content of the block polymer is 0.1 mass % or more, the block polymer can sufficiently disperse the pigment contained in the ink composition according to the present invention, and the content of 90 mass % or less results in appropriate ink viscosity.

The use of a pigment as a coloring material in an ink composition generally improves weather resistance. However, it is necessary to optimize various dispersion conditions in order to uniformly disperse the pigment, so that the dispersion stability and the viscosity of a prepared composition often fluctuate according to the dispersion method. In the present invention, use of the block polymer of the first embodiment, having extremely uniform molecular weight distribution, can reduce the fluctuations of the characteristics of the dispersion, and also reduce the viscosity. In this sense, the present invention is very suitable for the ink composition which employs a pigment as a coloring material and particularly suitable for the ink composition containing an encapsulated pigment.

In addition to the above characteristics, the ink composition can have responsiveness to a stimulus. Due to the stimulus responsiveness, the ink composition can acquire an excellent fixing property, for example, through ink thickening with a stimulus given in the step of forming an image. As the stimulus, a suitable item for forming the image is selected among a temperature change, exposure to an electromagnetic wave, a change of pH, and a change of concentration; or the combination thereof is used.

One preferred form according to the present invention is the ink composition that changes its characteristics with the stimulus, and then the composition can be used as a pigment-dispersed ink material which has the high dispersion stability of pigment, improved blur or feathering occurring when printed on a recording medium, and further a superior fixing property and abrasion resistance. For this reason, the ink composition as the pigment-dispersed ink material according to the present invention can be used as a material for forming an image having a high picture quality, with a low consumption energy and a high-speed.

A polymer-containing composition according to the present invention can vary the condition (the characteristics) in response to various stimuli. In the present invention, the "stimulus" includes a change of temperature; an application of an electric field; an exposure to light (an electromagnetic wave) such as an ultra-violet ray, a visible ray or an infrared ray; a change of pH in a composition; an addition of a chemical substance; and a change of concentration in a composition.

The ink composition according to the present invention can be preferably used as an ink for an ink-jet printing.

Next, a method for preparing the ink for the ink-jet printing in the present invention will be explained.

[Manufacturing Method for the Ink for the Ink-Jet Process]

An example of a method for preparing the ink for the ink-jet printing includes a process comprising adding pigment, the block polymer compound of the present invention and additives into ion-exchanged water, dispersing them with a dispersing apparatus, then removing coarse particles by centrifugation etc., subsequently adding water or solvent and additives, and stirring, mixing and filtering the product.

The dispersing apparatus includes, for instance, an ultrasonic homogenizer, a laboratory homogenizer, a colloid mill, a jet mill, a ball mill and the like, and each of them can be used alone or in combination with others.

When a self-dispersion pigment is used for the ink jet ink, the ink can be also prepared by a similar operation to the above-described method.

Next, the pattern-forming method of the present invention will be explained.

The ink composition according to the present invention can be used for making images by various pattern-forming methods such as various printing methods including an ink-jet process or electrophotography. The ink composition can be used particularly preferably in an ink-jet process.

The ink-jet process to be used may be a well-known process such as a piezo ink-jet method using a piezoelectric element, or a thermal ink-jet method that utilizes a bubble formed by thermal energy application for recording. Either of a continuous type or an on-demand type can be used. In addition, the ink composition according to the present invention can be used in a recording system where the ink is first applied onto an intermediate transfer member and then transferred to a final recording medium such as paper.

Next, a pattern-forming apparatus will be explained as one example of a liquid-discharging apparatus according to the present invention.

The ink composition according to the present invention can be used in an image-forming apparatus using various imaging methods such as various printing methods, an ink jet process and electrophotography, and particularly preferably used in an ink-jet recording apparatus.

The ink-jet recording apparatus which uses the ink for an ink-jet process according to the present invention includes an ink-jet recording apparatus such as of a piezo ink-jet type apparatus with the use of a piezoelectric element and a thermal ink-jet type apparatus utilizing a bubble formed by thermal energy application for recording.

FIG. 1 shows a schematic function diagram of an ink-jet recording apparatus. The central processing unit (CPU) of the ink-jet recording apparatus 20 is indicated by 50. A program for controlling the CPU 50 may be stored in a program memory 66 or stored in a memory means such as EEPROM (not shown) as so-called a firmware. The ink-jet recording apparatus receives recorded data from a recorded-data origination means (not shown and including a computer or the like) and store them in the program memory 66. The recorded data may be an image to be recorded, character information itself, compressed informations thereof, or encoded information as well. When processing the compressed or encoded information, the ink-jet recording apparatus can obtain the image or character information to be recorded, by making the CPU 50 extend or develop them. The ink-jet recording appparatus can inform the relative position of a head with respect to a medium to be recorded to the CPU 50, through an X encoder 62 (for instance, in an X-direction or a main scanning direction) and a Y encoder 64 (for instance, in a Y-direction or a vice-scanning direction), which have been previously installed.

The CPU 50 transmits signals for recording images to an X motor-driving circuit 52, a Y motor-driving circuit 54 and a head-driving circuit 60, on the basis of the information concerning the program memory 66, the encoder 62 and the Y encoder 64. The X motor-driving circuit 52 and the Y motor-driving circuit 54 respectively drive the X-direction driving motor 56 and the Y-direction driving motor 58 to move the head 70 relatively to the medium to be recorded into the recording position. The head drive circuit 60 transmits signals for making the head 70 discharge various ink compositions (Y, M, C, K) or stimulus-giving materials to work as stimulus to the head 70 when it has moved to the recording position, and carries out recording. The head 70 may be used for discharging a monochromatic ink composition or several sorts of ink compositions, or may also have a function for discharging a stimulus-giving material to work as stimulus, in addition to the above functions.

[Head Kit]

Figure 2:
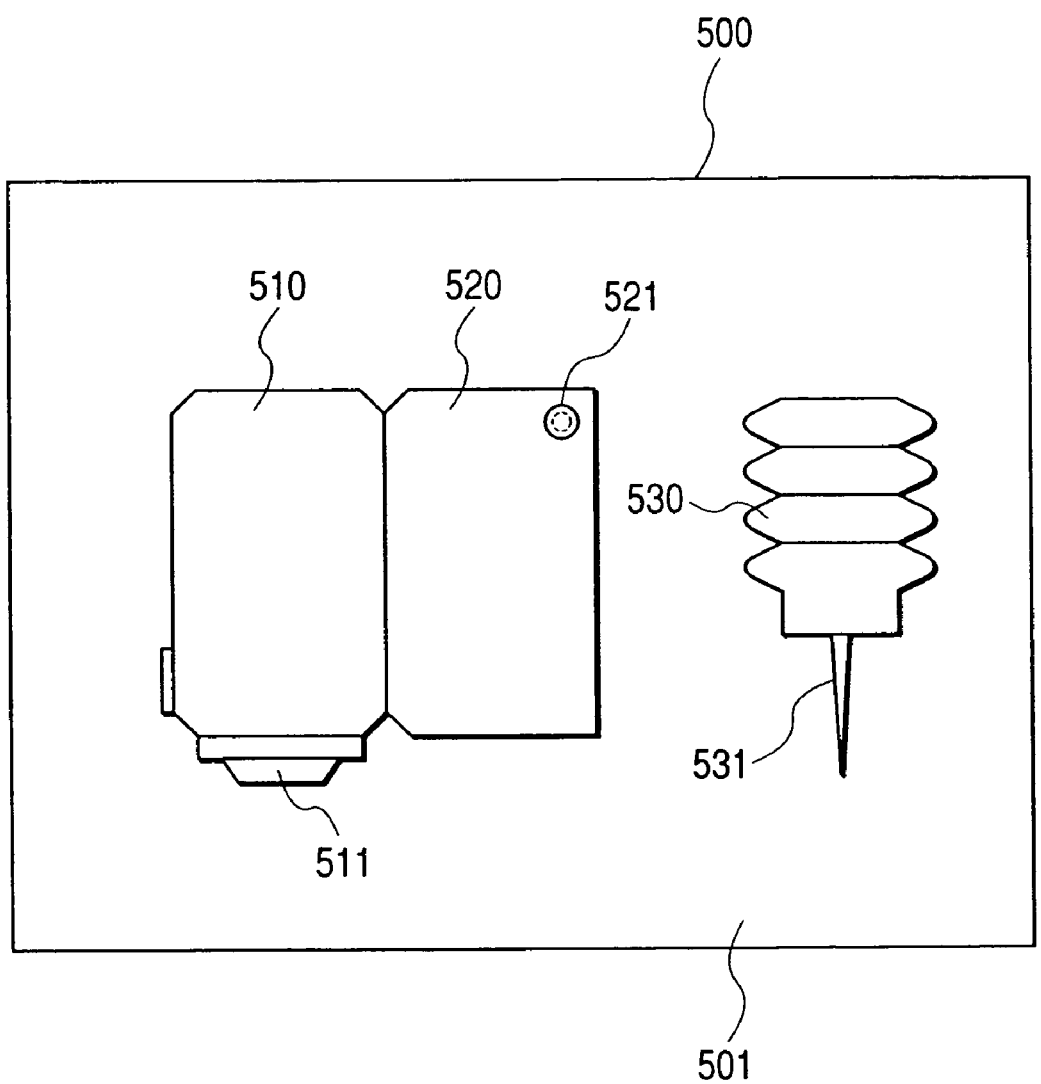
FIG. 2 schematically shows an ink-jet head kit according to the present invention.

An ink-jet head kit having the ink-jet head for discharging the ink composition of the present invention is explained. FIG. 2 schematically shows such an ink-jet head kit. The ink-jet head kit comprises an ink-jet head 510 having an ink-discharging port 511 for discharging ink, an ink container 520 inseparable or separable from the head 500, and ink-supplying means for holding an ink to be fed to the ink container, all accommodated in a kit vessel 501.

When the ink has been completely consumed, the ink in the ink-supplying means 530 is supplied to the ink container through the inserting part 531 (a needle, or the like) of the ink-supplying means, the part of which has been inserted into the air entrance 521 of the ink container or a joint with the ink-jet head, or into the hole opened on the wall of the ink container.

By thus accommodating the ink-jet head, the ink container and ink-supplying means in one kit vessel to make a kit, even when the ink is consumed completely, immediately as described above, the ink can be easily charged into the ink container and recording can be quickly started.

The ink-jet head kit according to the present invention has been explained with reference to an example which contains the ink-supplying means, but it may be an ink-jet head kit having a form of accommodating a separable type ink container filled with ink and a head in the kit vessel 510 but of possessing no ink-supplying means.

FIG. 2 shows only the ink-supplying means for filling ink in the ink container, but the kit may further contain means for supplying a foaming liquid to a foaming liquid container.

EXAMPLE 1

The present invention will be now explained below in detail, but the present invention is not limited to these examples.

A diblock polymer comprising isobutyl vinyl ether (IBVE: block A) and ethyl 4-(2-vinyloxy)ethoxybenzoate (VEOEtPhCOOEt: block B) (block polymer 1) was synthesized.

Air in a glass vessel provided with a three-way stopcock was replaced with nitrogen, then the vessel was heated to 250° C. under nitrogen gas to remove adsorption water. The system was cooled to room temperature, then 12 mmol (millimole) of IBVE, 16 mmol of ethyl acetate, 0.05 mmol of 1-isobutoxyethyl acetate and 11 ml of toluene were added therein, and the reaction system was cooled. When the temperature of the system reached 0° C., 0.2 mmol of ethyl aluminium sesquichloride (the equimolar mixture of diethyl aluminium chloride and ethyl aluminum dichloride) was added to start the polymerization. The molecular weight was monitored with time course using gel permeation chromatography (GPC), to confirm the completion of polymerization of block A.

Subsequently, a toluene solution containing 10 mmol of block B monomer component (The purity of the monomer component for the block B was 99.94% by gas chromatography) was added to continue the polymerization. After 20 hours, the polymerization reaction was stopped. The polymerization reaction was stopped by adding 0.3 mass % of an ammonia/methanol aqueous solution to the system. The reaction solution was diluted with dichloromethane, and was washed with 0.6M hydrochloric acid three times and then with distilled water three times. The obtained organic phase was concentrated to dryness, the product was vacuum-dried and repeatedly dialyzed against methanol by using a cellulose semi-permeable membrane to remove monomer compounds, and the objective diblock polymer was obtained. The obtained compound was identified by using NMR and GPC to prove that Mn was 16, 300, Mw/Mn was 1.089, and a polymerization ratio (mole ratio) of block A block B was 200:30.

Furthermore, the above obtained block polymer was hydrolyzed in a mixture of dimethylformamide and a sodium hydroxide solution to obtain a diblock polymer of which each block B component had been hydrolyzed and sodium salted. Identification of the compound was carried out by NMR and GPC. The molecular weight distribution Mw/Mn determined by GPC was 1.104 after hydrolysis.

Furthermore, the diblock polymer in a water dispersion was neutralized with 0.1 N hydrochloric acid, and the diblock polymer of which each block B component had been converted to free carboxylic acid. Identification of the compound was carried out by NMR and GPC.

EXAMPLE 2

An AB diblock polymer was synthesized in the same manner as in Example 1 except that the polymerization ratio A:B was 100:30 (block polymer (2)). The measurement result showed that Mn was 11,200 and Mw/Mn was 1.146.

Similarly, a diblock polymer (3) (polymerization ratio A:B=153:36, Mn=13,200, Mw/Mn=1.117), a diblock polymer (4) (polymerization ratio A:B=255:27, Mn=21, 500, Mw/Mn=1.079), and a diblock polymer (5) (polymerization ratio A:B=103:35, Mn=9,200, Mw/Mn=1.284) were synthesized. These block polymers were hydrolyzed in a mixture of dimethylformamide and a sodium hydroxide solution. Then, each block B component was hydrolyzed to sodium salt. Identification of the compound was carried out by NMR and GPC.

Furthermore, the diblock polymers were neutralized in a water dispersion with 0.1 N of hydrochloric acid to obtain diblock polymers of which "B" components had been converted to free carboxylic acid. Identification of the compound was carried out by NMR and GPC. The molecular weight distribution Mw/Mn of these polymers determined by GPC were 1.150, 1.124, 1.104 and 1.289 after the hydrolysis respectively.

EXAMPLE 3

A triblock polymer (a block polymer (6)) comprised of isobutyl vinyl ether and $CH_2=CHOCH_2CH_2OPhPh$ (IBVE-r-VEEtPhPh, block A), 2-ethoxyethyl vinyl ether (EOVE, block B) and 4-(2-vinyloxy) ethoxy ethyl benzoate (block C) was synthesized.

Air in a glass vessel provided with a three-way stopcock was replaced with nitrogen, then the vessel was heated to 250° C. under nitrogen gas to remove adsorption water. The system was cooled to room temperature, then 12 mmol (millimole) of IBVE-r-VEEtPhPh, 16 mmol of ethyl acetate, 0.05 mmol of 1-isobutoxyethyl acetate and 11 ml of toluene were added therein, and the reaction system was cooled. When the temperature of the system reached 0° C., 0.2 mmol of ethyl aluminium sesquichloride (the equimolar mixture of diethyl aluminum chloride and ethyl aluminum dichloride) was added to start the polymerization. The molecular weight was monitored with time course using gel permeation chromatography (GPC), to confirm the completion of polymerization of block A. Next, 12 mmol of EOVE for block B was added and reaction was continued. After confirming the completion of block B synthesis by GPC monitoring, 12 ml of 10 mmol solution of block C component in toluene was added to continue the polymerization. After 20 hours, the polymerization reaction was stopped by adding 0.3 mass % of an ammonia/methanol aqueous solution to the system. The reaction solution was diluted with dichloromethane, and was washed with 0.6M hydrochloric acid three times and then with distilled water three times. The obtained organic phase was concentrated to dryness, the product was vacuum-dried and repeatedly dialyzed against methanol by using a cellulose semi-permeable membrane to remove monomer compounds, and the objective triblock polymer was obtained. The obtained compound was identified by NMR and GPC.

The measurement result showed that Mn was 48,500 and Mw/Mn was 1.198. The polymerization ratio A:B:C was 100:200:30. The polymerization ratio of two sorts of monomers in the block A was 1:1. The polymer having free carboxylic acid or salt thereof was obtained as in Example 1. The molecular weight distribution Mw/Mn by GPC was 1.203 after hydrolysis.

EXAMPLE 4

The carboxylate salt type block polymer (2) obtained in Example 2 (26 parts by mass), and a liposoluble dye, oil blue N (a brand name, made by Sigma-Aldrich Corporation) (10 parts by mass) were dissolved in dimethyl formamide (100 parts by mass), and the mixture was converted to a water phase with distilled water (500 parts by mass) to obtain a block polymer composition. The composition was left to stand for ten days, but the oil blue neither separated nor precipitated.

EXAMPLE 5

Preparation of Water-Based Inks 1 to 6

By using the above-described polymer (1) to (6) which had been neutralized with alkali, the respective water-based inks 1 to 6 were prepared as follows.

Each polymer (3 parts by weight) and C.I. solvent blue 44 (an oil-soluble dye) (1 part by weight) were dissolved in N,N-dimethylformamide (9 parts by weight). To the above mixture, 98 parts by weight of water was added, and then further 2 parts by weight of diethylene glycol and 2 parts by weight of glycerin were added to obtain a water-based ink.
Preparation of water-based inks 7 and 8 (Comparative inks)

By using a styrene-sodium acrylate block polymer (with a copolymerization ratio of 100:40, molecular weight Mn=15,800, and Mw/Mn=1.515) instead of the polymers (1) to (6), a water-based ink 7 was prepared in the similar way to that for preparing the above-described inks.

In addition, a water-based ink 8 was prepared in the same manner as in Example 5 except that a styrene-sodium acrylate block polymer (copolymerization ratio of 130:36, molecular weight Mn=18,800, Mw/Mn 1.508) was used instead of the polymers (1) to (6).

Viscosity and printing property of each of the above-described water-based inks 1 to 8 were evaluated. The result is shown in Table 1.

Evaluation Method:

1. Viscosity
The viscosity of the water-based ink was measured at 25° C. with an E-type rotation viscometer.

2. Printing Property
The water-based ink was charged in a print head of an ink-jet printer (trade name: BJC820, CANON INC.), and letters were printed on a plain paper (cord number: 5552A0002 QKDA4) made by CANON INC. The degree of blur in the print (whitish unprinted streaks) was visually evaluated according to the following grades:
  5: no blur (streaks);
  4: streaks are slightly observed but practically no problem;
  3: streaks are observed but letters are sufficiently readable;
  2: streaks and other defects in printing are conspicuous and letters are barely readable; and
  1: unreadable portion exists.

TABLE 1

|  |  | Viscosity (mPa · s) | Printing property |
|---|---|---|---|
| Example 5 | Water-based ink 1 | 2.9 | 4 |
|  | Water-based ink 2 | 3.1 | 5 |
|  | Water-based ink 3 | 4.1 | 5 |
|  | Water-based ink 4 | 3.6 | 5 |
|  | Water-based ink 5 | 5.2 | 5 |
|  | Water-based ink 6 | 6.8 | 4 |
| Comparative inks | Water-based ink 7 | 6.8 | 2 |
|  | Water-based ink 8 | 4.9 | 1 |

Separately, letters were printed with water-based inks 1, 3 and 7 on a plain paper. After one minute, Kimwipe (trade name, made by Crecia Co. Ltd.) was put on the print, a weight of 500 g/12.56 cm² was placed thereon and moved reciprocally three times. The degree of abrasion was evaluated in the following five grades. The evaluation result was level 5 for both water-based inks 1 and 3, and level 3 for a water-based ink 7.

Evaluation Grade:
  5: no abrasion
  4: slight abrasion in a level of no practical problem
  3: conspicuous abrasion but generally readable printing
  2: letters are partly unreadable
  1: all letters are unreadable

EXAMPLE 6

Water-based inks 9 to 16 were prepared by the same manner as in Example 5 except that the dye of inks 1–8 was replaced with a cyan pigment (LIONOGEN BLUE BJ made by Toyo Ink Mfg. Co., Ltd.) to test printing property. Of these water-based inks 9 to 16, viscosity and image recording properties were evaluated. The results are shown in Table 2.

TABLE 2

|  |  | Viscosity (mPa · s) | Printing property |
|---|---|---|---|
| Example 6 | Water-based ink 9 | 3.8 | 4 |
|  | Water-based ink 10 | 4.2 | 5 |
|  | Water-based ink 11 | 4.8 | 5 |
|  | Water-based ink 12 | 4.1 | 5 |
|  | Water-based ink 13 | 5.4 | 5 |
|  | Water-based ink 14 | 7.5 | 4 |
| Comparative inks | Water-based ink 15 | 8.9 | 2 |
|  | Water-based ink 16 | 9.2 | 1 |

Letters were printed on a plain paper with the water-based inks 9 and 11. After one minute, Kimwipe (made by Crecia Co. Ltd.) was placed on the print, a weight of 500 g/12.56 cm$^2$ was placed thereon and moved three times reciprocally. Then the degree of abrasion was evaluated in the above five grades. The evaluation result was level 5 for both water-based inks 9 and 11.

This application claims priority from Japanese Patent Application Nos. 2003-286925 filed on Aug. 5, 2003 and 2004-216364 filed on Jul. 23, 2004, which are hereby incorporated by reference herein.

What is claimed is:

1. A block polymer comprising a plurality of block segments, at least one block segment comprising a repeating unit having an ester moiety bonded to a main chain in a forward direction through a connecting group of two or more atoms, wherein the block polymer has a molecular weight distribution (Mw/Mn) of 1.3 or less;

wherein the ester moiety is a free organic acid or ionic salt thereof.

2. The block polymer according to claim 1, wherein the polymer has the repeating unit structure of polyalkenyl ether.

3. The block polymer according to claim 1, wherein the polymer is amphipathic.

4. The block polymer according to claim 1, wherein the repeating unit structure having the ester moiety bonded in a forward direction being a free acid or ionic salt has the repeating unit expressed by the following general formula 1 or 2:

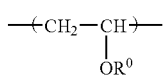

General formula (1)

wherein, R$^0$ represents —X—COOH, —X—COOR$^{10}$ and —X—COO-M; X represents a straight-chain, branched-chain or cyclic alkylene group having 1 to 20 carbon atoms, —(CH(R$^2$)—CH(R$^3$)—O)$_p$—(CH2)$_m$—, —(CH$_2$)$_m$—(O)$_n$(CH$_2$)$_q$—, or the structure where at least one of these methylene groups is substituted by an oxygen atom or aromatic ring structure; p represents an integer of 1 to 18; m represents an integer of 1 to 36; n represents 1 or 0; q represents an integer of 1 to 18; R$^{10}$ represents an alkyl group or the aromatic ring structure which may be substituted; M represents a monovalent or polyvalent cation; each of R$^2$ and R$^3$ represents a hydrogen atom or polyvalent atom or an alkyl group, and may be identical with or different from the other; or

General formula (2)

wherein, B represents a straight-chain or branched-chain alkylene group having 1 to 15 carbon atoms, which may be substituted; r represents an integer of 1 to 30; each B may be different from other if r is plural; s represents an integer of 2 to 30; R$^1$ represents a hydrogen atom, an alkyl group which may be substituted, an aromatic ring structure which may be substituted, or M; and when R$^1$ is M, the O(BO)$_r$(CH$_2$)$_s$COO part is a carboxylate anion and M represents a monovalent or polyvalent metal cation.

5. A polymer-containing composition comprising: a block polymer according to claim 1, a solvent or a dispersion medium, and a functional material.

6. The polymer-containing composition according to claim 5, wherein the functional material is contained inside the block polymer.

7. An ink composition comprising: a block polymer according to claim 1, a solvent or dispersion medium, and a coloring material.

8. A liquid-applying method comprising the steps of: preparing a polymer-containing composition according to claim 7; and applying the polymer-containing composition to a medium.

9. A liquid-applying apparatus comprising: liquid-applying means for applying a polymer-containing composition according to claim 7 by applying a discharging energy to the composition, and driving means for driving the liquid-discharging means.

10. A head kit comprising: a discharging head for discharging an ink composition according to claim 7, and a container for holding the ink composition to be supplied to the discharging head.

* * * * *

UNITED STATES PATENT AND TRADEMARK OFFICE
CERTIFICATE OF CORRECTION

| | |
|---|---|
| PATENT NO. | : 7,151,156 B2 |
| APPLICATION NO. | : 10/909282 |
| DATED | : December 19, 2006 |
| INVENTOR(S) | : Koichi Sato et al. |

It is certified that error appears in the above-identified patent and that said Letters Patent is hereby corrected as shown below:

ON THE TITLE PAGE

Item (56), FOREIGN PATENT DOCUMENTS,

"JP 1243624" should read --EP 1246624--.

"JP 1285948" should read --EP 1285948--.

COLUMN 1

Line 24, "home" should read --homes--.

COLUMN 4

Line 24, "includes" should read --include--.

COLUMN 6

Line 10, "$OCH_2(CH_3)CH_2O(CH_2)_7OPhCOOC_2H_5$" should read --$OCH(CH_3)CH_2O(CH_2)_7OPhCOOC_2H_5$--.

UNITED STATES PATENT AND TRADEMARK OFFICE
CERTIFICATE OF CORRECTION

PATENT NO. : 7,151,156 B2
APPLICATION NO. : 10/909282
DATED : December 19, 2006
INVENTOR(S) : Koichi Sato et al.

It is certified that error appears in the above-identified patent and that said Letters Patent is hereby corrected as shown below:

COLUMN 11

After line 8, insert the following (four pages):

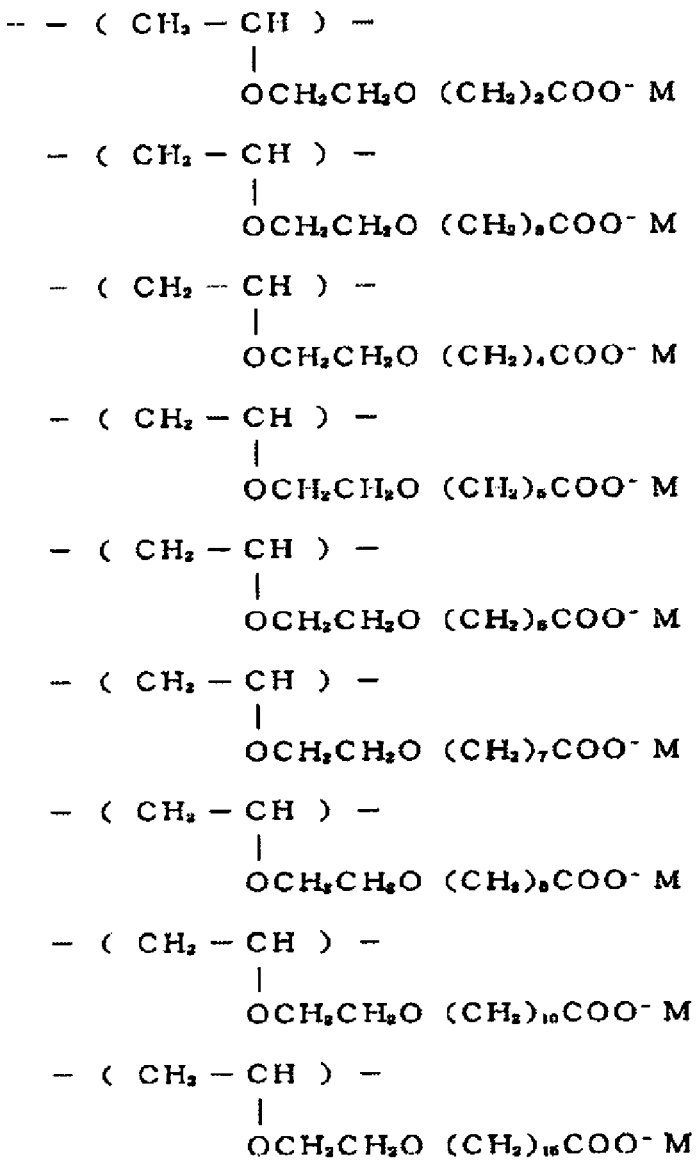

UNITED STATES PATENT AND TRADEMARK OFFICE
CERTIFICATE OF CORRECTION

PATENT NO.        : 7,151,156 B2
APPLICATION NO. : 10/909282
DATED             : December 19, 2006
INVENTOR(S)       : Koichi Sato et al.

It is certified that error appears in the above-identified patent and that said Letters Patent is hereby corrected as shown below:

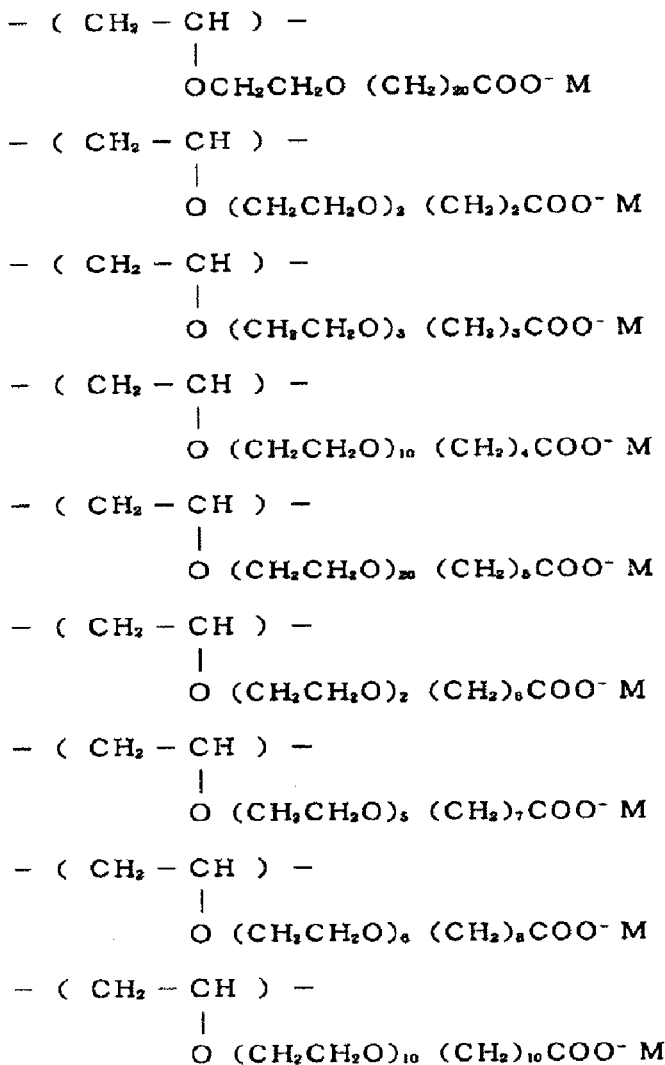

UNITED STATES PATENT AND TRADEMARK OFFICE
CERTIFICATE OF CORRECTION

PATENT NO. : 7,151,156 B2
APPLICATION NO. : 10/909282
DATED : December 19, 2006
INVENTOR(S) : Koichi Sato et al.

It is certified that error appears in the above-identified patent and that said Letters Patent is hereby corrected as shown below:

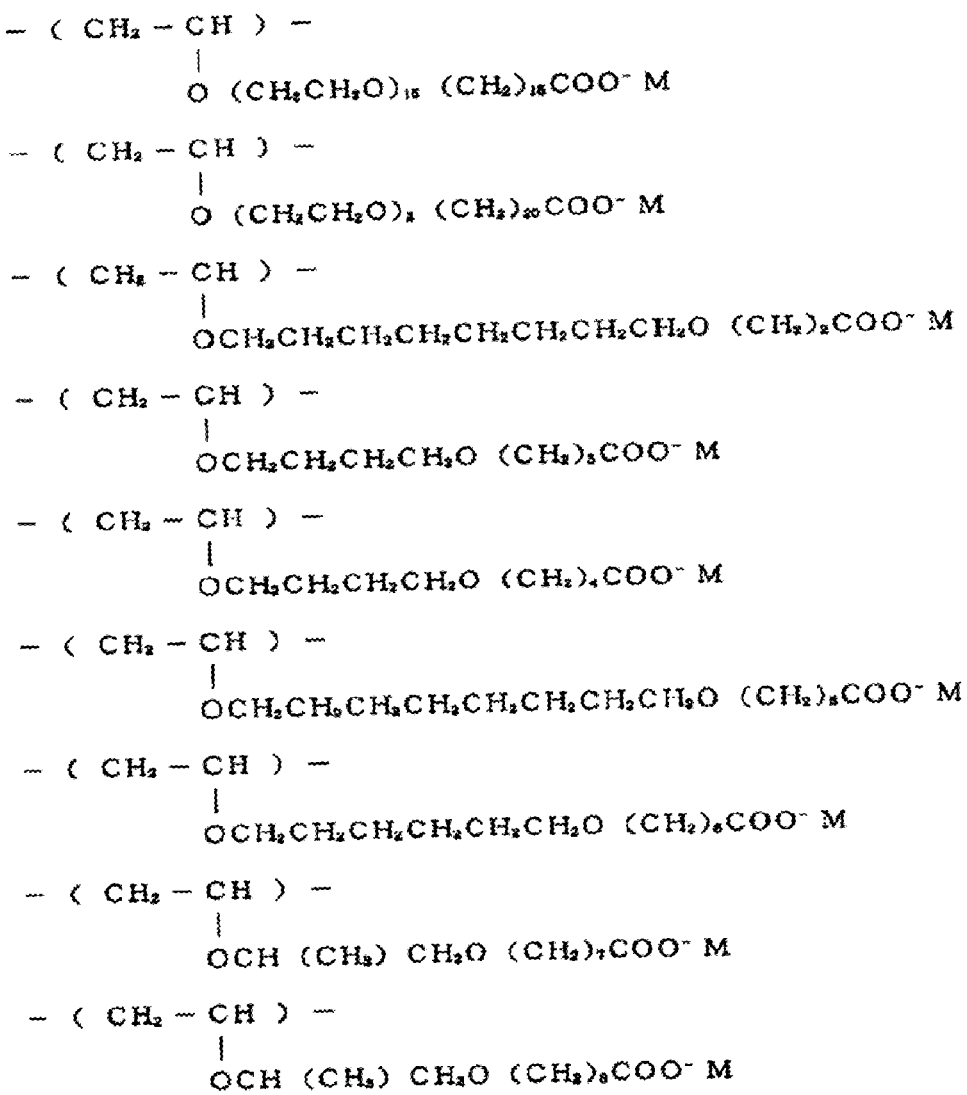

UNITED STATES PATENT AND TRADEMARK OFFICE
CERTIFICATE OF CORRECTION

PATENT NO. : 7,151,156 B2  
APPLICATION NO. : 10/909282  
DATED : December 19, 2006  
INVENTOR(S) : Koichi Sato et al.

It is certified that error appears in the above-identified patent and that said Letters Patent is hereby corrected as shown below:

$$-(CH_2-CH)-$$
$$\quad\quad |$$
$$\quad\quad OCH_2CH(CH_3)\,O\,(CH_2)_{10}COO^-\,M$$

$$-(CH_2-CH)-$$
$$\quad\quad |$$
$$\quad\quad OCH(C_2H_5)\,CH_2O\,(CH_2)_{15}COO^-\,M$$

$$-(CH_2-CH)-$$
$$\quad\quad |$$
$$\quad\quad OCH_2CH(CH_3)\,O\,(CH_2)_{20}COO^-\,M\quad --$$

UNITED STATES PATENT AND TRADEMARK OFFICE
CERTIFICATE OF CORRECTION

PATENT NO. : 7,151,156 B2
APPLICATION NO. : 10/909282
DATED : December 19, 2006
INVENTOR(S) : Koichi Sato et al.

It is certified that error appears in the above-identified patent and that said Letters Patent is hereby corrected as shown below:

COLUMN 11

Line 22, "having a" should read --having an--.

Line 25, "segment C" should read --segment, and C--.

COLUMN 13

Line 22, "acid)" should read --acid).--.

Line 25, "preferabe" should read --preferable--.

Line 40, "carrying-out" should read --carrying out--.

Line 49, "preferable" should read --preferably--.

COLUMN 16

Line 7, "blue-2-101" should read --blue-2, -101--.

Line 63, "methahol" should read --methanol--.

COLUMN 17

Line 45, "high-speed" should read --high speed--.

COLUMN 18

Line 43, "a firmware" should read --firmware--.

Line 46, "store" should read --stores--.

Line 62, "encoder 62" should read --X encoder 62--.

COLUMN 20

Line 13, "block A block B" should read --block A : block B--.

UNITED STATES PATENT AND TRADEMARK OFFICE
CERTIFICATE OF CORRECTION

PATENT NO.         : 7,151,156 B2
APPLICATION NO. : 10/909282
DATED                  : December 19, 2006
INVENTOR(S)       : Koichi Sato et al.

It is certified that error appears in the above-identified patent and that said Letters Patent is hereby corrected as shown below:

COLUMN 21

Line 63, "Mw/Mn 1.508" should read --Mw/Mn = 1.508--.

COLUMN 23

Line 41, "—(CH($R^2$)—CH($R^3$)—O)$_p$—(CH2)$_m$—" should read as follows:
-- —(CH($R^2$)—CH($R^3$)—O)$_p$—(CH$_2$)$_m$— --.

COLUMN 24

Lines 7-11, the text "General formula (2)" and the chemical drawing shown beside that text should be deleted and replaced with the following text and chemical drawing:

-- General formula (2)

--.

Signed and Sealed this

Twenty-seventh Day of May, 2008

JON W. DUDAS
*Director of the United States Patent and Trademark Office*